(12) United States Patent
Ahrens

(10) Patent No.: US 8,096,763 B2
(45) Date of Patent: Jan. 17, 2012

(54) WIND-OPERATED POWER GENERATOR

(75) Inventor: Uwe Ahrens, Berlin (DE)

(73) Assignee: NTS Energie- und Transportsysteme GmbH, Berlin (DE)

( * ) Notice: Subject to any disclaimer, the term of this patent is extended or adjusted under 35 U.S.C. 154(b) by 487 days.

(21) Appl. No.: 12/306,328

(22) PCT Filed: Apr. 4, 2007

(86) PCT No.: PCT/EP2007/003018
§ 371 (c)(1),
(2), (4) Date: Dec. 23, 2008

(87) PCT Pub. No.: WO2008/006413
PCT Pub. Date: Jan. 17, 2008

(65) Prior Publication Data
US 2009/0285681 A1    Nov. 19, 2009

(30) Foreign Application Priority Data
Jul. 14, 2006    (EP) ..................... 06014634

(51) Int. Cl.
*F03D 5/02*    (2006.01)
*F03D 11/00*    (2006.01)

(52) U.S. Cl. ................ 416/7; 416/84; 415/7
(58) Field of Classification Search ............... None
See application file for complete search history.

(56) References Cited

U.S. PATENT DOCUMENTS

| | | | |
|---|---|---|---|
| 3,887,817 A * | 6/1975 | Steelman | 290/43 |
| 3,924,827 A * | 12/1975 | Lois | 244/153 R |
| 3,987,987 A | 10/1976 | Payne et al. | 244/153 R |
| 4,076,190 A * | 2/1978 | Lois | 244/153 R |
| 4,124,182 A | 11/1978 | Loeb | 244/153 R |
| 4,166,596 A * | 9/1979 | Mouton et al. | 244/30 |
| 4,491,739 A * | 1/1985 | Watson | 290/44 |
| 4,832,571 A * | 5/1989 | Carrol | 416/132 B |
| 5,435,259 A | 7/1995 | Labrador | 114/39.31 |
| 6,072,245 A | 6/2000 | Ockels | 290/55 |
| 6,254,034 B1 * | 7/2001 | Carpenter | 244/153 R |
| 7,129,596 B2 * | 10/2006 | Macedo | 290/55 |
| 7,188,808 B1 * | 3/2007 | Olson | 244/153 R |
| 7,275,719 B2 * | 10/2007 | Olson | 244/155 A |
| 2002/0033019 A1 | 3/2002 | Mizzi | 60/398 |
| 2004/0206086 A1 * | 10/2004 | Kim | 60/641.8 |
| 2006/0033340 A1 * | 2/2006 | Knott | 290/44 |
| 2008/0223982 A1 * | 9/2008 | Pri-Paz et al. | 244/33 |

FOREIGN PATENT DOCUMENTS
EP    0 841 480    5/1998
* cited by examiner

*Primary Examiner* — Scott B. Geyer
(74) *Attorney, Agent, or Firm* — Roberts & Roberts, LLP

(57) ABSTRACT

A method for converting kinetic energy in horizontal currents of naturally occurring fluids above ground into mechanical energy. A circulating element is guided in a closed cycle and is arranged substantially in a plane parallel to the ground. The circulating element has two lengthwise adjustable traction ropes/chains fastened in two opposite positions. The ropes/chains have buoyancy elements at their free ends. The buoyancy elements have cross-sections for the current to impact. In an embodiment, a traction rope/chain fixed to a section of the circulating element facing the horizontal current is adjusted to be longer than the traction rope/chain fixed to a section of the circulating element facing away from horizontal current. The lengths of the two traction ropes/chains in the region of the points of return of the circulating element are reversed upon which the course of the circulating element relative to the horizontal current is reversed, when seen in the direction of circulation of the circulating element.

20 Claims, 5 Drawing Sheets

WIND-OPERATED POWER GENERATOR

The invention relates to a method and to a system for converting kinetic energy, contained in horizontal currents occurring in naturally present fluids floating above ground, into useful mechanical energy.

Virtually everywhere on Earth, naturally occurring horizontal currents exist in the fluids that are essentially present (the air contained above the surface of the Earth in the atmosphere, and the fresh or salt water accumulating in bodies of water). The term horizontal currents is understood in the context of the present invention to mean currents that each have a horizontal component. Examples of such currents are winds in the various atmospheric strata as well as currents in the sea or other currents in bodies of water. In principle, these currents are stores of large quantities of energy, whose exploitation is increasingly desirable and has already been done in the most various ways. Examples of uses of such currents that have already been technologically achieved are tidal power plants, which utilize the flow of the amounts of water flowing toward land at flood and retreating at ebb to generate electricity by way of turbines and generators disposed on them, or wind farms, whose rotors, driven by the wind blowing over the land, convert wind energy first into mechanical energy and, via generators connected to them, then into electrical energy.

Compared to obtaining energy from fossil fuels or the use of nuclear processes, making the energy present in such currents useful has the advantage of being substantially more environmentally friendly.

With the invention, a novel method for making the energies contained in flowing fluids useful is therefore to be disclosed. Moreover, a system is to be disclosed with which such a method can be employed.

The fundamental recognition on which the method and the system are based is that horizontal currents floating above ground, because of friction compared to the nonmoving ground, flow close to the ground at a speed that tends toward zero, but with increasing distance from the ground have an increasing flow speed. This principle applies for both air currents, such as the continental winds that blow over wide regions of the surface of the Earth in a substantially constant direction, and currents in water, such as sea currents.

This fundamental principle is exploited by the invention, in a first aspect, in that buoyant bodies moving in the current that are fixed to a revolving element via tethering cables or tethering chains are adjusted to different altitudes relative to the ground. Wherever the buoyant bodies are meant to move with the current, the tethering cable or tethering chain is adjusted to be suitably long so that the buoyant body comes to rest in a region of the current which is high above the ground in which the flow speed is greater than in regions near the ground. Contrarily, a buoyant body which must be moved against the current in the system (and by which at least one further buoyant body has to be pulled) is brought closer to the ground, where the flow speed of the fluid is less, by means of a suitably shorter tethering cable or tethering chain. The difference between the flow speeds engaging the buoyant bodies produces a resultant flow speed that drives the system comprising the revolving element and the buoyant bodies in a direction of revolution and thus delivers useful mechanical energy to this system. The essential prerequisite for this is that the tethering cables or chains have a markedly lesser impact cross section than the buoyant bodies disposed on their free ends.

Now, once the buoyant bodies have arrived at reversal points of the revolving element (these are the points at which "the direction changes" in the system, or in other words the revolving element extends transversely to the flow direction and then again extends parallel to the flow in the opposite direction), the length of the tethering cables or tethering chains must be suitably adapted so that the buoyant bodies, previously running counter to the current and now entrained in the direction of the current, are left at an altitude that is even farther from the ground than the buoyant body that previously ran in the direction of the current and now is being pulled counter to it.

A further improvement in the efficiency of the method and the system of the invention is obtained when the buoyant bodies are provided with variable impact cross sections. For instance, the buoyant bodies may have additional faces on the order of "sails" or "parasails", which are used whenever the buoyant body is moving with the horizontal current, or else the buoyant bodies can be constructed variably in their entire cross section.

In an alternative aspect, it is fundamentally also possible to use only a variation as described above of the impact cross section in order to set the revolving element, with the buoyant bodies disposed on tethering cables or tethering chains whose lengths that are preferably identical but in any case that remain identical, into a revolving motion and thus to convert energy from the horizontal current.

However, the best efficiency is attained with a combination of the two provisions described above, that is, adjustment of the lengths of the tethering cables (or tethering chains) and adjustment of the impact cross section.

So that energy contained over as long as possible a portion of the revolving element in the current can be converted into mechanically usable energy, it is advantageous if the revolving element is designed as described herein. In this way, energy can be converted in the longer portions, extending substantially parallel to the direction of the horizontal current, and the portions, extending along the reversal point, in which energy must be expended in order to reverse the system are correspondingly short.

Any bodies that have positive buoyancy in the flowing fluid can be considered for the buoyant bodies. In the case of air, these can for instance be airships, gas balloons, or the like. For use in flowing water, gas- or air-filled balloons or buoys can be considered.

A method according to the invention and a system according to the invention, or more precisely mechanical energy made usable by these methods and these systems, can be employed in manifold ways. For instance, it is possible to use a system according to the invention for transporting goods and/or persons. This is especially attractive when winds prevailing in the atmosphere are used as the horizontal current. Then airships, for instance, which are sufficiently large and suitable for carrying loads can be used as buoyant bodies, since they can hold containers with goods or gondolas that carry persons. This way of using a system according to the invention in any case makes it possible to transport goods and/or persons in a direction oriented substantially in or opposite to the primary wind direction prevailing in the region where the transporting is taking place. Taking Northern Europe as an example, because of the west winds that predominantly prevail there, transportation in a substantially east-west direction is possible.

For transportation over longer distances, it can be advantageous if such a transportation system is realized not by a single large system according to the invention, but rather by a plurality of systems according to the invention connected to one another in the manner of a chain. For the specific technological embodiment, recourse may for instance be had to known aerial cable cars, in which embodiments for transferring cable car gondolas from one cable circuit to another are attained. In a similar way, tethering cables or tethering chains, for instance, with buoyant bodies secured to them can then be transferred from one revolving element to another, in which as in the known aerial cable car systems, they are unlatched from one system and latched into the next.

A further possible application of a system or method according to the invention is for obtaining electrical energy. All that must be done is for the mechanical energy, dictated by the continuous revolution of the revolving element, to be tapped, for instance by way of suitable gear wheel connections, in order to drive generators with this energy in a known way, and to convert the mechanical energy into electrical energy. It is fundamentally attractive for the mechanical energy obtained from the revolution of the revolving element to be converted into electrical energy only when there is a demand for the electrical energy. At times of decreased demand for electrical energy (for instance at night), it is advantageous from the standpoint of the energy balance to convert the mechanical energy into a different kind of mechanical energy, since reduced losses then occur. For instance, the mechanical energy obtained from the revolution of the revolving element can be used to pump water or some other liquid into reservoirs located at a height; at times of high demand for electrical energy, the potential energy thus obtained can be converted back into electrical energy in a known manner via turbines and driving suitable generators, by allowing the water pumped up to the height to flow out.

Further advantages and characteristics of the invention will become apparent from the ensuing description of an exemplary embodiment in conjunction with the accompanying drawings. In the drawings.

Figure 1:
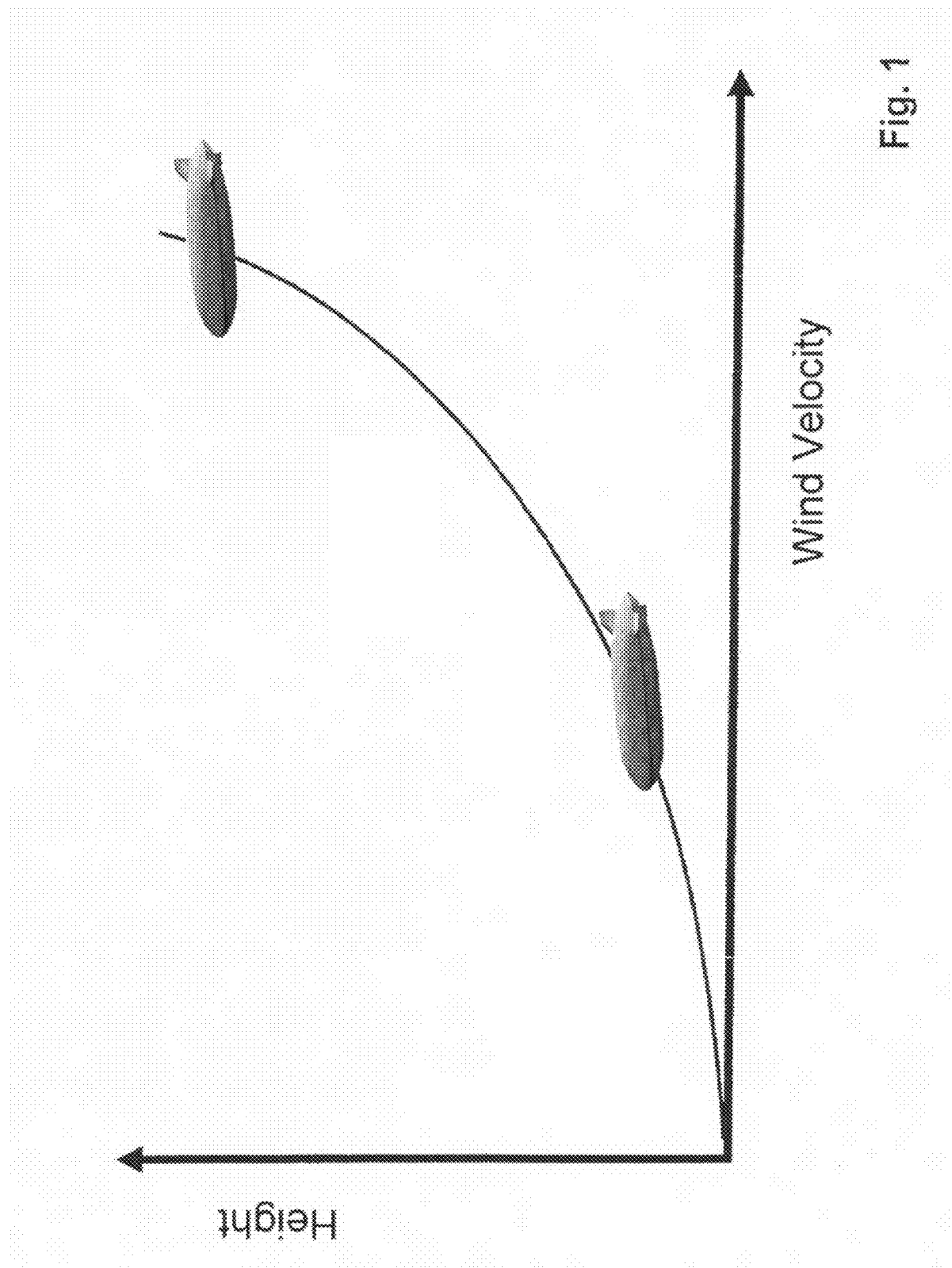
FIG. 1 is a schematic graph showing the ratio of the wind speed to the altitude above ground.

In the drawings, one possible exemplary embodiment of the method of the invention and the system of the invention is sketched out, with individual subsidiary variants.

FIG. 1, first, schematically shows in terms of wind how the wind speed increases with the distance from the soil (ground), or in other words with the altitude. As examples of buoyant bodies, airships are shown here at different altitudes, in order to make it clear that these altitudes experience different wind speeds.

Figure 2:
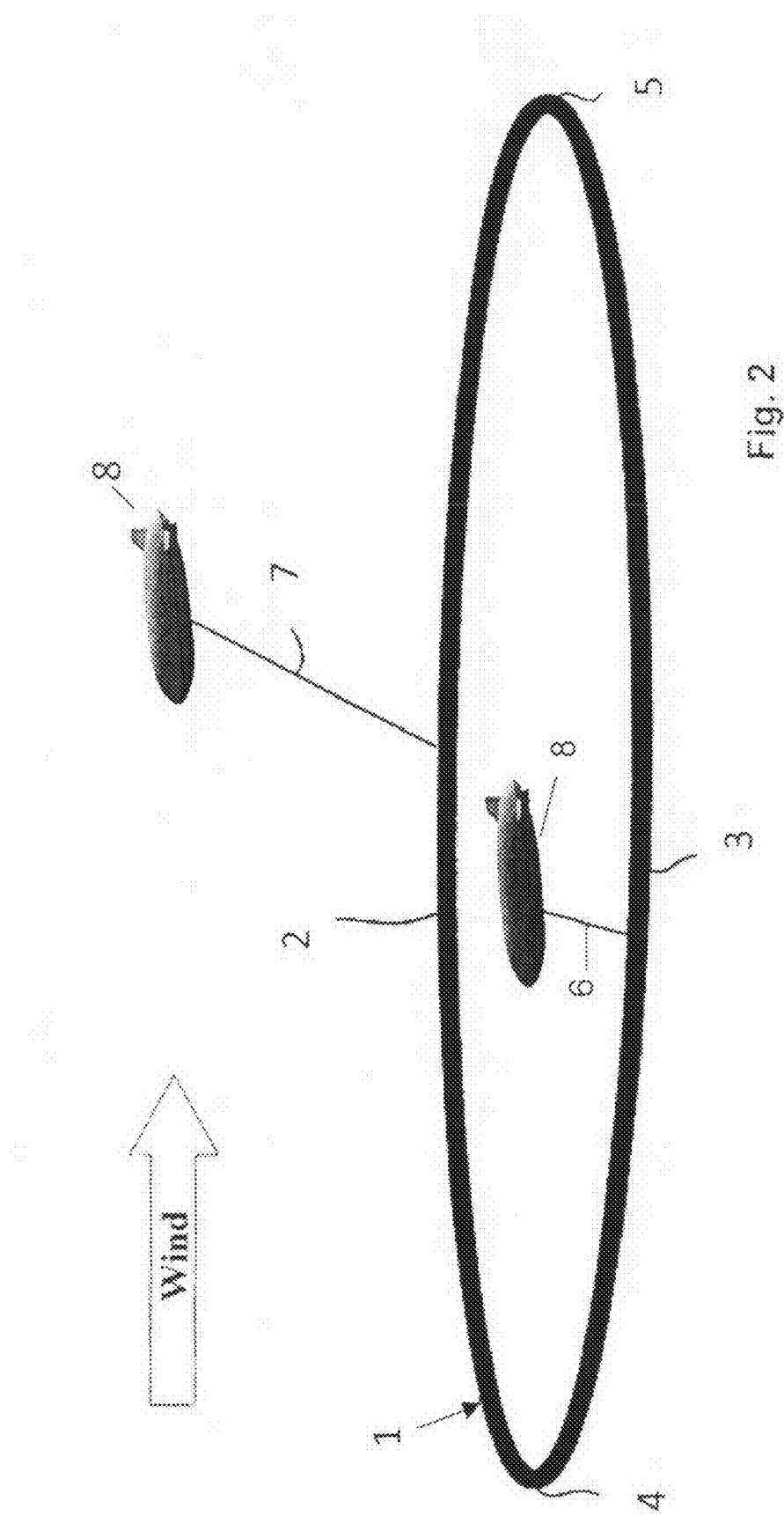
FIG. 2 is a schematic illustration of a system according to the invention.

The principle that ensues from what is shown in FIG. 1 is employed by the invention for converting kinetic energy, contained in the wind (air flow), into useful mechanical energy. A system according to the invention for this energy conversion is schematically shown in FIG. 2. As its essential component, the system includes a revolving element 1, guided along a closed cycle. This revolving element may for instance be a revolving, closed cable, or a chain of that kind. The revolving element 1, as shown in the drawing, extends parallel to or opposite the wind direction, which is indicated by an arrow in the drawing, with the substantially longer portions 2 and 3. Substantially shorter portions 4 and 5 of the revolving element 1 extend transversely to the wind direction and form the reversal points.

At positions substantially diametrically opposite one another, tethering cables 6 and 7 are secured to the revolving element 1, and one buoyant body, in the form of an airship 8, is fixed to each of their free ends. The lengths of the tethering cables 6, 7 are adjustable, and thus the spacing of the airships 8 to the revolving element 1 is also adjustable. The revolving element 1 is preferably mounted directly on the ground, that is, the surface of the Earth, so that the length of the tethering cables 6 and 7 determines the distance of the airships 8 from the ground.

The tethering cables 6, 7 are connected to devices which are disposed on the revolving element 1 and which make it possible to vary the lengths of the tethering cables 6, 7. Such devices may for instance be cable winches, or the like.

As can be seen in the drawing, an airship 8 flying in the direction of the wind is secured to the tethering cable 7, which is adjusted to a longer length than the tethering cable 6 that supports the airship 8 that is flying against the wind direction. A comparison with FIG. 1 shows that as a result of this adjustment, the airship 8 secured to the tethering cable 7 is exposed to a greater wind speed than the airship 8 secured to the shorter tethering cable 6. Thus the airship 8 that is fixed to the longer tethering cable 7 is engaged by a greater force than that engaging the airship 8 connected to the shorter tethering cable 6. As a result, the entire system, including the revolving element 1, is set into motion in a clockwise direction of rotation, thus converting the flow energy of the wind into mechanical energy.

When the airships 8 now reach the reversal points 4 and 5 of the revolving element 1, the tethering cable 6 is made longer at the reversal point 4, and the tethering cable 7 is made shorter at the reversal point 5. As a result of the kinetic energy stored in the revolving element 1 as a result of its motion, the airships 8 are pulled past the reversal points 4 and 5, respectively, and are again capable of supplying the propulsion of the revolving element 1 in the manner described above.

Figure 3:
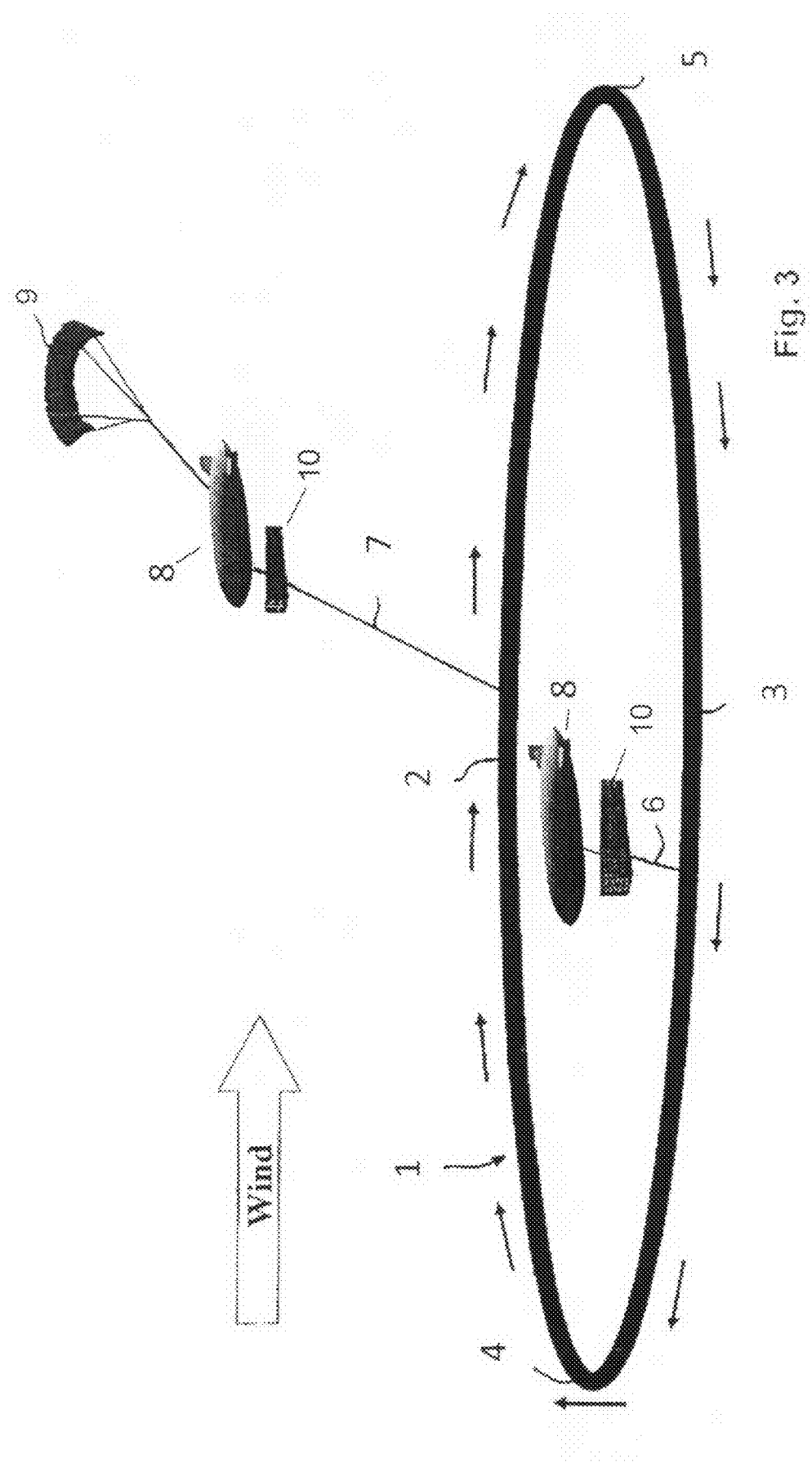
FIG. 3 is a schematic illustration of a system according to the invention used for transporting goods.

In FIG. 3, a variant of the system of the invention is shown schematically, in which the airship 8 flying with the wind at a greater altitude on the longer tethering cable 7 additionally employs a parasail 9, in order to increase the impact cross section presented to the wind and thus to make increased use of the energy available in the wind current. At the reversal point 5, the parasail 9 is pulled in, and at the reversal point 4, when the airship 8 arrives there, it is used again. In this drawing as well, the direction of revolution of the revolving element 1 is again indicated by arrows. Also in this drawing, one possible use of the system of the invention is suggested, namely its use for transporting useful loads 10. The useful loads may for instance be containers for goods, but they can also be gondolas with passengers, or a mixture of means for transporting goods and passengers.

Figure 4:
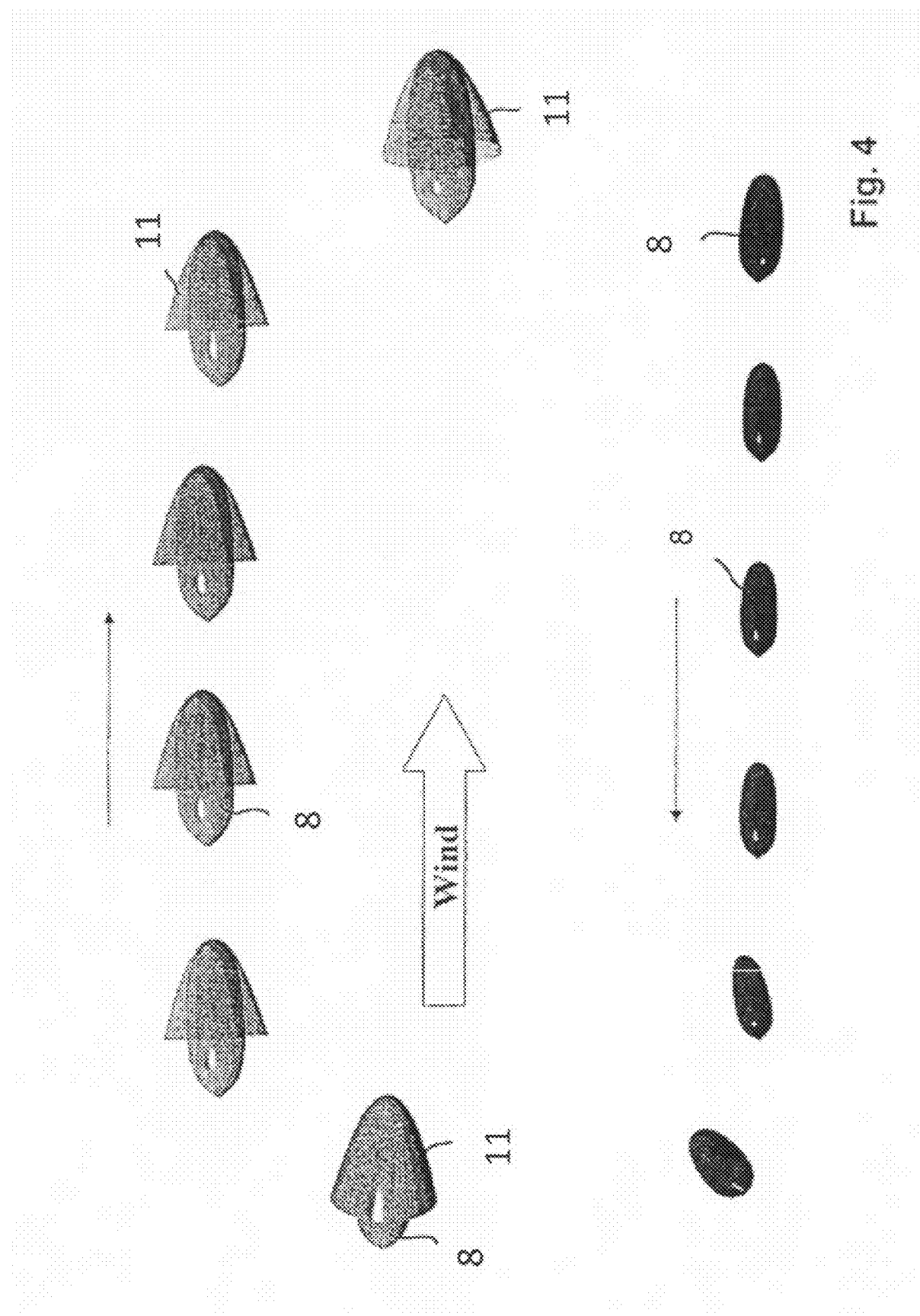
FIG. 4 is a schematic illustration of one possible augmentation of a buoyant body with a driving sail that increases its cross section.
Figure 5:
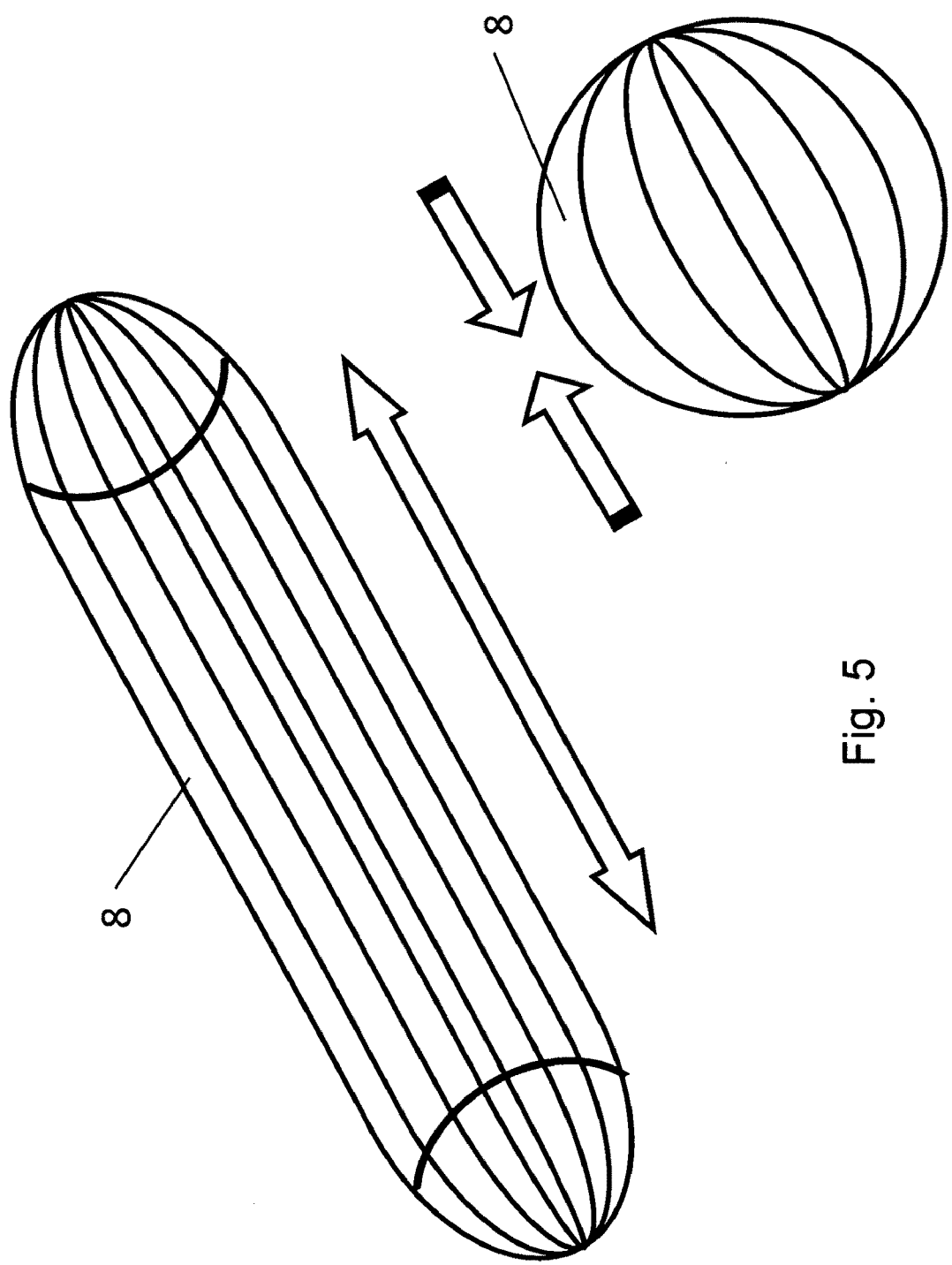
FIG. 5 schematically shows a further possibility for dynamically varying the impact cross section of a buoyant body.

In FIGS. 4 and 5, further possibilities for varying the impact cross section is sketched for the buoyant bodies, for instance in the form of the airships 8. One possibility is shown in FIG. 4 and pertains to the use of a hood-like air sail 11, disposed at the forward tip, in the travel direction, of the airship 8. This sail is advantageously embodied such that in a tailwind situation it is deployed by the wind engaging it and then, because of its funnel- or mushroom-shaped geometry, presents a markedly increased impact cross section to the wind. With a headwind, the air sail is automatically reefed, so that overall, the airship presents a smaller impact cross section to the wind.

A further possibility of varying the impact cross section is sketched in FIG. 5. By varying the length of the airship 8, given a suitable construction, a change in the cross section can be simultaneously attained. If the airship 8 is drawn out in length, then the cross section decreases and thus the impact cross section as well; if it is contracted in its longitudinal direction, the impact cross section is deployed in balloonlike fashion, so that it can be better caught by an engaging air current.

The system according to the invention as sketched here, and the mechanical energy converted with it from a current (in this case an air current) can be used, as shown for instance in FIG. 3, for transporting goods; at the same time, however, it is also conceivable and is an aspect of the invention to convert this energy further into electrical energy, by driving generators or the like, for instance, with the mechanical energy obtained. For instance, in this way, wind farms can be constructed that, unlike the known wind rotors always constructed close to the ground, have no dependency on the wind speed prevailing near the ground. Typical operating altitudes for a system according to the invention in the atmospheric air can be altitudes up to the range of 2,000 to 3,000 meters, so that for instance an airship secured to a longer tethering cable 7, or some other buoyant body, floats at this altitude, while a buoyant body traveling against the wind secured to a shortened tethering cable 6 floats at an altitude of several hundred meters. A usable wind speed prevails almost always at such altitudes, so that such power plants can operate reliably virtually permanently.

The invention claimed is:

1. A method for converting kinetic energy, contained in horizontal currents occurring in naturally present fluids floating above ground, into useful mechanical energy, in which at least one revolving element, guided in a closed cycle and disposed substantially horizontally above ground, is provided, on which, at at least two positions substantially diametrically opposite one another, adjustable-length tethering cables and/or tethering chains are secured with buoyant bodies disposed on their free ends, each of the bodies having an impact cross section for the current, wherein
   a) a tethering cable and/or a tethering chain, fixed to a portion of the revolving element that, viewed in a direction of revolution of the revolving element points in the direction of the horizontal current, is adjusted to have a greater length than a tethering cable and/or a tethering chain of that kind which is fixed to a portion of the revolving element that, viewed in the direction of revolution of the revolving element, points counter to the direction of the horizontal current, and wherein
   b) the lengths of the tethering cables, in the region of reversal points of the revolving element, in which regions, viewed in the direction of revolution of the revolving element, the course of the revolving element reverses relative to the horizontal current, are adapted such that they again meet the condition described in a).

2. The method as defined by claim 1, wherein the impact cross section of each of the buoyant bodies is varied such that the impact cross section of a buoyant body moving in the direction of the horizontal current is greater than the impact cross section of a buoyant body moving in the opposite direction.

3. The method as defined by claim 2 wherein the revolving element is designed such that its portions, extending in the direction of the horizontal current and counter to it, respectively, are longer than portions pointing transversely to the horizontal current.

4. The method as defined by claim 1 wherein the revolving element is designed such that its portions, extending in the direction of the horizontal current and counter to it, respectively, are longer than portions pointing transversely to the horizontal current.

5. A method for converting kinetic energy, contained in horizontal currents occurring in naturally present fluids floating above ground, into useful mechanical energy, in which at least one revolving element, guided in a closed cycle and disposed substantially horizontally above ground, is provided, on which, at at least two positions substantially diametrically opposite one another, adjustable-length tethering cables and/or tethering chains are secured with buoyant bodies disposed on their free ends, each of the bodies having an impact cross section for the current, wherein the impact cross section of each of the buoyant is varied such that the impact cross section of a buoyant body moving in the direction of the horizontal current is greater than the impact cross section of a buoyant body moving in the opposite direction.

6. The method as defined by claim 5, wherein the tethering cables and/or tethering chains are adjustable in length; and that
   a) a tethering cable and/or a tethering chain, fixed to a portion of the revolving element that, viewed in a direction of revolution of the revolving element points in the direction of the horizontal current, is adjusted to have a greater length than a tethering cable and/or a tethering chain of that kind which is fixed to a portion of the revolving element that, viewed in the direction of revolution of the revolving element, points counter to the direction of the horizontal current, and wherein
   b) the lengths of the tethering cables, in the region of reversal points of the revolving element, in which regions, viewed in the direction of revolution of the revolving element, the course of the revolving element reverses relative to the horizontal current, are adapted such that they again meet the condition described in a).

7. The method as defined by claim 6 wherein the revolving element is designed such that its portions, extending in the direction of the horizontal current and counter to it, respectively, are longer than portions pointing transversely to the horizontal current.

8. The method as defined by claim 5 wherein the revolving element is designed such that its portions, extending in the direction of the horizontal current and counter to it, respectively, are longer than portions pointing transversely to the horizontal current.

9. A system for performing a method as defined by claim 1, having at least one revolving element guided in a closed cycle and disposed substantially horizontally above ground, having at least two tethering cables and/or tethering chains disposed on the revolving element in positions substantially diametrically opposite one another, which are adjustable in length and on the free ends of each of which a buoyant body with an impact cross section for the horizontal current is disposed, and having devices for adjusting the length of the tethering cables and/or tethering chains.

10. The system as defined by claim 9, wherein the buoyant bodies have variable impact cross sections.

11. The system as defined by claim 10 wherein the revolving element is present in an elongated oval shape, wherein longer portions of the revolving element are oriented substantially parallel to the flow direction of the horizontal current, while shorter portions are located at reversal points, which shorter portions extend transversely to the flow direction of the horizontal current.

12. The system as defined by claim 9 wherein the revolving element is present in an elongated oval shape, wherein longer portions of the revolving element are oriented substantially parallel to the flow direction of the horizontal current, while shorter portions are located at reversal points, which shorter portions extend transversely to the flow direction of the horizontal current.

13. A system for performing a method as defined by claim 5, having at least one revolving element guided in a closed cycle and disposed substantially horizontally above ground, having at least two tethering cables and/or tethering chains disposed on the revolving element in positions substantially diametrically opposite one another, on the free ends of each of which a buoyant body with an impact cross section for the horizontal current is disposed, and the buoyant bodies have variable impact cross sections.

14. The system as defined by claim 13, wherein the tethering cables or tethering chains are adjustable in length; and that the system has devices for adjusting the length of the tethering cables and/or tethering chains.

15. A system for performing a method as defined by claim 2, having at least one revolving element guided in a closed cycle and disposed substantially horizontally above ground, having at least two tethering cables and/or tethering chains disposed on the revolving element in positions substantially diametrically opposite one another, which are adjustable in length and on the free ends of each of which a buoyant body with an impact cross section for the horizontal current is disposed, and having devices for adjusting the length of the tethering cables and/or tethering chains.

16. The system as defined by claim 15, wherein the buoyant bodies have variable impact cross sections.

17. The system as defined by claim 16 wherein the revolving element is present in an elongated oval shape, wherein longer portions of the revolving element are oriented substantially parallel to the flow direction of the horizontal current, while shorter portions are located at reversal points, which shorter portions extend transversely to the flow direction of the horizontal current.

18. The system as defined by claim 15 wherein the revolving element is present in an elongated oval shape, wherein longer portions of the revolving element are oriented substantially parallel to the flow direction of the horizontal current, while shorter portions are located at reversal points, which shorter portions extend transversely to the flow direction of the horizontal current.

19. A system for performing a method as defined by claim 6, having at least one revolving element guided in a closed cycle and disposed substantially horizontally above ground, having at least two tethering cables and/or tethering chains disposed on the revolving element in positions substantially diametrically opposite one another, on the free ends of each of which a buoyant body with an impact cross section for the horizontal current is disposed, and the buoyant bodies have variable impact cross sections.

20. The system as defined by claim 19, wherein the tethering cables or tethering chains are adjustable in length; and that the system has devices for adjusting the length of the tethering cables and/or tethering chains.

* * * * *